(12) United States Patent
Nie et al.

(10) Patent No.: US 11,581,012 B1
(45) Date of Patent: Feb. 14, 2023

(54) DATA STORAGE DEVICE WITH MULTI-ACTUATOR DRIVE WITH CROSS-ACTUATOR ALIGNMENT

(71) Applicant: Western Digital Technologies, Inc., San Jose, CA (US)

(72) Inventors: Jianbin Nie, San Jose, CA (US); Trung Trieu, San Jose, CA (US); Bryson Mitsui, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/543,209

(22) Filed: Dec. 6, 2021

(51) Int. Cl.
*G11B 5/596* (2006.01)
*G11B 5/012* (2006.01)

(52) U.S. Cl.
CPC .................. *G11B 5/012* (2013.01)

(58) Field of Classification Search
CPC ............ G11B 5/59661; G11B 5/59688; G11B 5/59663; G11B 21/02; G11B 5/5543; G11B 5/5539; G11B 20/18; G11B 5/59666; G11B 20/10231; G11B 5/59633; G11B 5/5965

USPC .................. 360/55, 75, 49, 77.08, 77.06
See application file for complete search history.

(56) References Cited

U.S. PATENT DOCUMENTS

| 8,570,681 | B2 * | 10/2013 | Ho | ............ | G11B 5/09 |
| | | | | | 360/49 |
| 9,208,810 | B1 | 12/2015 | Nie et al. | | |
| 9,245,560 | B1 | 1/2016 | Nie et al. | | |
| 10,984,826 | B2 * | 4/2021 | Tani | ...... | G11B 5/5539 |

* cited by examiner

*Primary Examiner* — Nabil Z Hindi
(74) *Attorney, Agent, or Firm* — Neugeboren O'Dowd PC (57) ABSTRACT

Various illustrative aspects are directed to a data storage device. The data storage device comprises a first actuator; a second actuator; a first set of disks, comprising one or more disks configured to correspond with the first actuator; a second set of disks, comprising one or more disks configured to correspond with the second actuator; and one or more processing devices. The one or more processing devices are configured to: write final spirals on the first set of disks; determine a time delta to implement cross-actuator alignment between the first set of disks and the second set of disks; and apply the time delta in writing final spirals for the second set of disks.

17 Claims, 6 Drawing Sheets

DATA STORAGE DEVICE WITH MULTI-ACTUATOR DRIVE WITH CROSS-ACTUATOR ALIGNMENT

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

Figure 1:
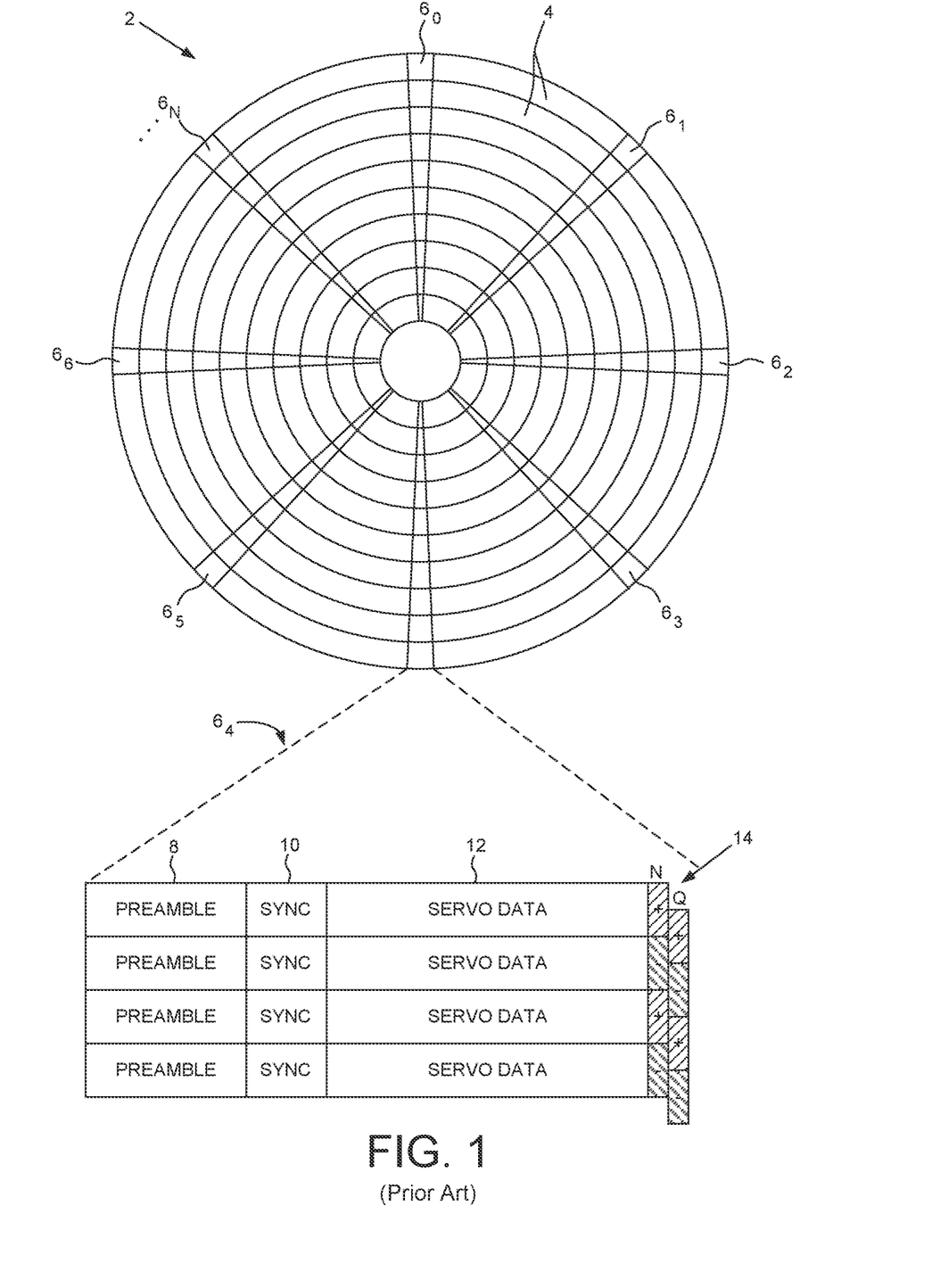
FIG. 1 shows a prior art disk format as comprising a number of radially-spaced, concentric servo tracks defined by servo wedges recorded around the circumference of each servo track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines. The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

SUMMARY

Various aspects disclosed herein provide data storage devices such as hard disk drives with multi-actuator drives with cross-actuator alignment, among other aspects. For multi-actuator drives of this disclosure, the servo wedges on the disk surfaces may be aligned such that the servo wedges that correspond with the second actuator are spaced away from the servo wedges that correspond with the first actuator by a selected fraction of a wedge-to-wedge time, such as substantially approximately one-half of the wedge-to-wedge time, i.e., the duration of time between one servo wedge and then a subsequent wedge to encounter its corresponding read/write head. This cross-actuator wedge alignment may be accomplished in a self-servo track write process. By spacing the servo wedges corresponding to the respective actuators apart by a selected fraction of a wedge-to-wedge time, such as approximately half the wedge-to-wedge time, among other novel advantages of this disclosure, instead of communicating data through the data channels of both actuators without regard for any relation in bandwidth requirements between the data channels of the two actuators, as in the prior art, the data storage device may transmit and receive data in data communication channels common to both actuators in alternating turns between data communicated through the first actuator and data communicated through the second actuator. Data storage devices of this disclosure may thereby significantly increase data read and write communication bandwidth to and from the disk drive surfaces, by means of novel and advantageous features and methods of this disclosure.

Further example implementations of this disclosure may also comprise three or more actuators, with three or more corresponding sets of substantially evenly spaced out sets of servo wedges, spaced apart by a selected fraction of a wedge-to-wedge time, such as approximately one-third of a wedge-to-wedge time in a hard disk drive with three actuators, and corresponding fractional spacings for greater numbers of actuators. Cross-actuator alignment methods and techniques of this disclosure may achieve alignment of servo wedges between two actuators with high precision, and may be done reliably in high-volume manufacturing of devices or systems of this disclosure.

Various illustrative aspects are directed to a data storage device. The data storage device comprises a first actuator; a second actuator; a first set of disks, comprising one or more disks configured to correspond with the first actuator; a second set of disks, comprising one or more disks configured to correspond with the second actuator; and one or more processing devices. The one or more processing devices are configured to: write final spirals on the first set of disks; determine a time delta to implement cross-actuator alignment between the first set of disks and the second set of disks; and apply the time delta in writing final spirals for the second set of disks.

Various illustrative aspects are directed to a method that comprises outputting, by one or more processing devices, instructions to write final spirals on a first set of disks; determining, by the one or more processing devices, a time delta to implement cross-actuator alignment between the first set of disks and a second set of disks; and applying, by the one or more processing devices, the time delta in outputting instructions to write final spirals for the second set of disks.

Various illustrative aspects are directed to one or more processing devices, comprising: means for writing final spirals on a first set of disks in a data storage system; means for determining a time delta to implement cross-actuator alignment between the first set of disks and a second set of disks; and means for applying the time delta in writing final spirals for the second set of disks.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

DETAILED DESCRIPTION

Figure 2A:
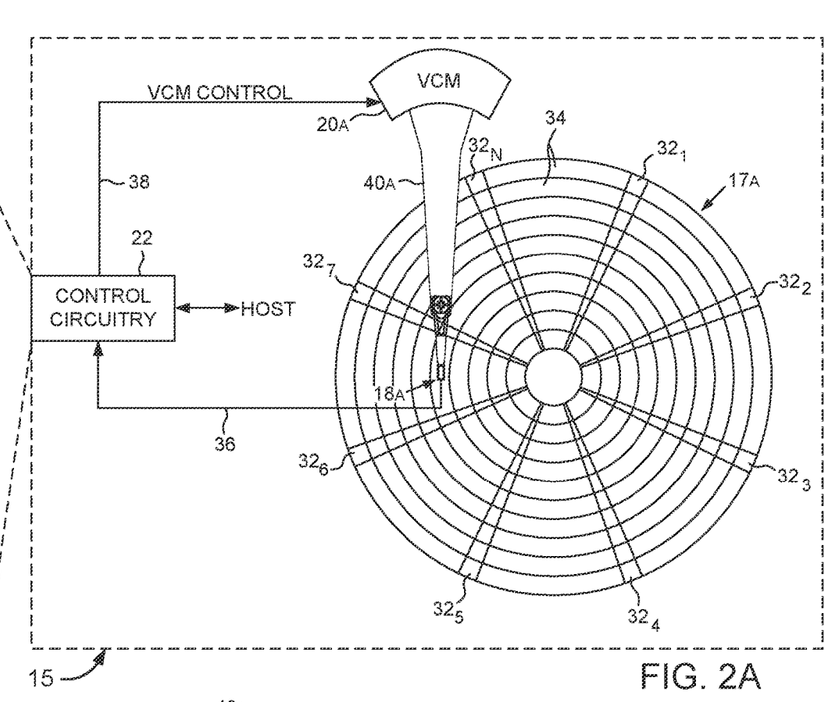
FIGS. 2A and 2B illustrate a conceptual block diagram of a data storage device in the form of a disk drive, in accordance with aspects of the present disclosure.
Figure 2B:
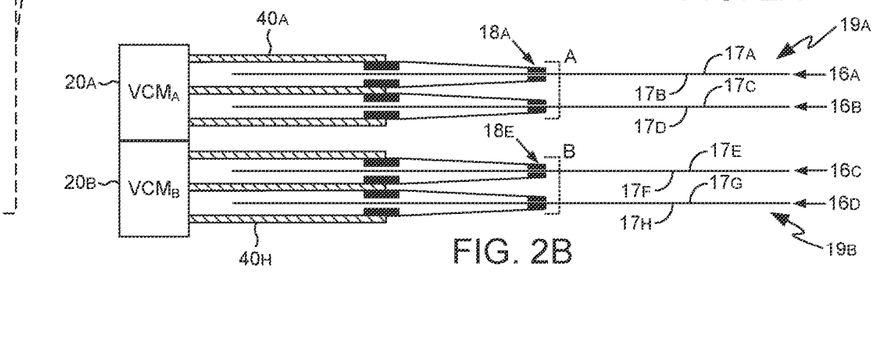
Figure 2C:
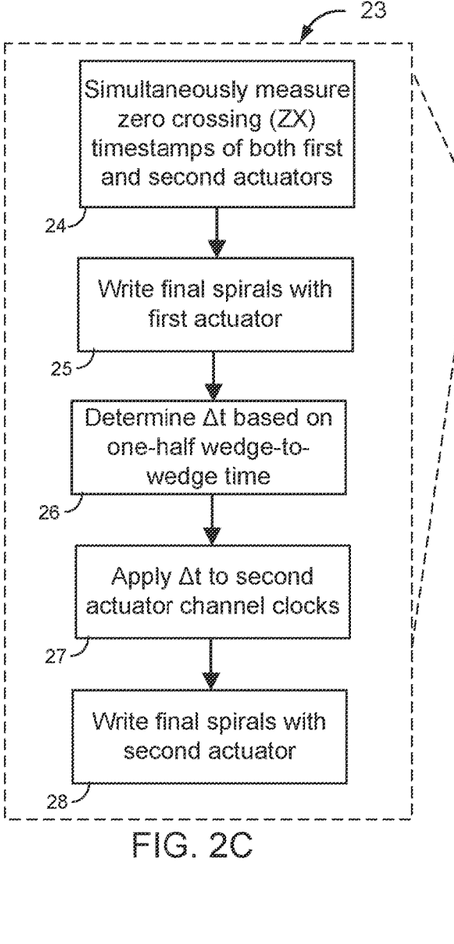
FIG. 2C depicts a flowchart for an example method that control circuitry of a disk drive may perform or execute in controlling the operations of the disk drive, in accordance with aspects of the present disclosure.

FIGS. 2A and 2B illustrate a conceptual block diagram of a data storage device in the form of a disk drive 15, in accordance with aspects of the present disclosure. Disk drive 15 comprises control circuitry 22, a first actuator 20A and a second actuator 20B ("actuators 20") in a multi-actuator design, and a plurality of hard disks 16A, 16B, 16C, 16D ("hard disks 16"). FIG. 2C depicts a flowchart for an example method 23 that control circuitry 22 of disk drive 15 may perform or execute in controlling the operations of disk drive 15, in accordance with aspects of the present disclosure. In various examples, disk drive 15 may be considered to perform functions and tasks and execute processes and methods and techniques, including aspects of example method 23, in terms of its control circuitry 22, which may take the form of one or more processing devices, executing computer-readable instructions of software code or firmware code, for example. Other examples may include other numbers of hard disks and disk surfaces, other numbers of actuators, and other numbers of disks and disk surfaces that correspond with a respective actuator, for example.

Actuators 20 may be implemented in the form of voice coil motors. First actuator 20A may actuate a first plurality of heads, e.g., head 18A, over first set of disk surfaces 19A. Second actuator 20B may actuate a second plurality of heads, e.g., head 18E, over second set of disk surfaces 19B. Hard disks 16A and 16B comprise disk surfaces 17A and 17B, and 17C and 17D, respectively, which collectively form a first set of disk surfaces 19A which correspond with first actuator 20A, e.g., such that each of the first plurality of heads writes to and reads from its respective disk surface it's operated proximate to among first set of disk surfaces 19A. Hard disks 16C and 16D comprise disk surfaces 17E and 17F, and 17G and 17H, respectively, which collectively form a second set of disk surfaces 19B which correspond with second actuator 20B.

The first set of disk surfaces 19A may correspond with first actuator 20A in that first actuator 20A is disposed to manipulate read/write heads in close proximity with the disk surfaces of the first set of disk surfaces 19A, in order to write control features and data to, and read control signals and data from, the respective disk surface proximate to each read/write head under the control of the first actuator 20A. Likewise, the second set of disk surfaces 19B may correspond with second actuator 20B in that second actuator 20B is disposed to manipulate read/write heads in close proximity with the disk surfaces of the second set of disk surfaces 19B, in order to write control features and data to, and read control signals and data from, the respective disk surface proximate to each read/write head under the control of the second actuator 20B. The term "disk drive surface" may be understood to have the ordinary meaning it has to persons skilled in the applicable engineering fields of art. The term "disk drive surface" may be understood to include both the very outer surface layer of a disk drive as well as a significant volume of disk drive matter beneath the outer surface layer, and may include the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of servo wedges 32$_1$-32$_N$ that define a plurality of servo tracks 34, wherein data tracks are defined relative to the servo tracks at the same or different radial density. Control circuitry 22 processes a read signal 36 emanating from the respective head, e.g., head 18A to read from disk surface 17A, to demodulate the servo wedges 32$_1$-32$_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator 20A, which functions as a coarse actuator, and which rotates an actuator arm, e.g., actuator arm 40A, about a pivot in order to actuate the corresponding heads radially over the first set of disk surfaces 19A in a direction that reduces the PES.

The heads may also be servoed using a fine actuator, such as a piezoelectric (PZT) actuator, configured to actuate a suspension relative to the actuator arm, and/or configured to actuate the head relative to the suspension. Various examples may comprise a double suspension assembly (DSA), which comprises two actuators, which may comprise, e.g., a coarse actuator and a fine actuator. Various examples may comprise a triple suspension assembly (TSA), which comprises three actuators, which may comprise, e.g., a coarse actuator, a fine actuator, and an ultrafine actuator each of the latter two of which may be configured to actuate a suspension relative to the actuator arm, and/or configured to actuate the head relative to the suspension, for example. Other examples may comprise other numbers, arrangements, or levels of precision of actuators. The servo wedges 321-32N may comprise any suitable head position information, such as a track address for coarse positioning and servo bursts for fine positioning, as illustrative examples. The servo bursts may comprise any suitable pattern, such as an amplitude-based servo pattern and/or a phase-based servo pattern, including as described above with reference to FIG. 1.

In the example of FIG. 2B, the first and second actuators 20A and 20B rotate the respective sets of actuator arms, e.g., actuator arms 40A and 40B, about a common pivot. In another example, a first VCM and a second VCM (or other types of actuators) may each be configured to actuate a respective set of actuator arms about a separate pivot, for example, mounted at different circumferential locations about the disks. Other examples may employ more than two actuators, which may be actuated about a common pivot, or which may be comprised in multiple multi-actuators mounted at different circumferential locations about the disks.

In executing example method 23 of FIG. 2C (aspects of which will also be further explained below with reference to the further figures), control circuitry 22 may issue a plurality of commands to other components of disk drive 15, receive information from other components of disk drive 15, and perform internal operations, such as performing calculations and determinations. In particular, control circuitry 22 may simultaneously measure once-per-revolution spindle zero crossing (ZX) timestamps of both first and second actuators 20 (24). Control circuitry 22 may then write final spirals on the first set of disk surfaces 19A with first actuator 20A (25). Control circuitry 22 may then determine a delta t time interval, also referred to as a time delta, based on a selected fraction of a wedge-to-wedge time, such as one-half wedge-to-wedge time (26). In particular, control circuitry 22 may measure the timing distances from a respective bootstrap spiral seam to the zero crossing for each of the two actuators 20, measure a difference between the two timing distances, and then add one-half of the wedge-to-wedge time to the difference between the two timing distances, thereby determining the desired delta t time interval to be applied to achieve cross-actuator alignment. This determination may thus be represented by Equation 1:

$$\Delta t = t_0 - t_1 + \frac{t_{w2w}}{2} \quad \text{(Equation 1)}$$

In other examples, control circuitry 22 may select any different fraction of a wedge-to-wedge time in determining the delta t time interval, such as three-eighths or five-eighths, or one-quarter or three-quarters of a wedge-to-wedge time. Control circuitry 22 may then apply the delta t time interval to the channel clocks for second actuator 20B, shifting the channel clocks by the delta t time interval (27). Control circuitry 22 may then write the final spirals to the second set of disk surfaces 19B with second actuator 20B (28). In subsequent process steps, disk drive 15 may write servo wedges at positions based on the positions of the final spirals. By writing the final spirals to the second set of disks 19B after shifting the channel clocks for second actuator 20B by the determined delta t, control circuitry 22 may thereby implement alignment of the servo wedges between first and second sets of disk surfaces 19, with the servo wedges of the second set of disk surfaces 19B aligned with high precision to positions approximately circumferentially halfway between the circumferential distances between the servo wedges on the first set of disk surfaces 19A, i.e., at approximately one-half of the circumferential wedge-to-wedge distance around from the servo wedges on the first set of disk surfaces 19A. Further details of method 23 are apparent in the descriptions of the further figures as follows.

Figure 3:
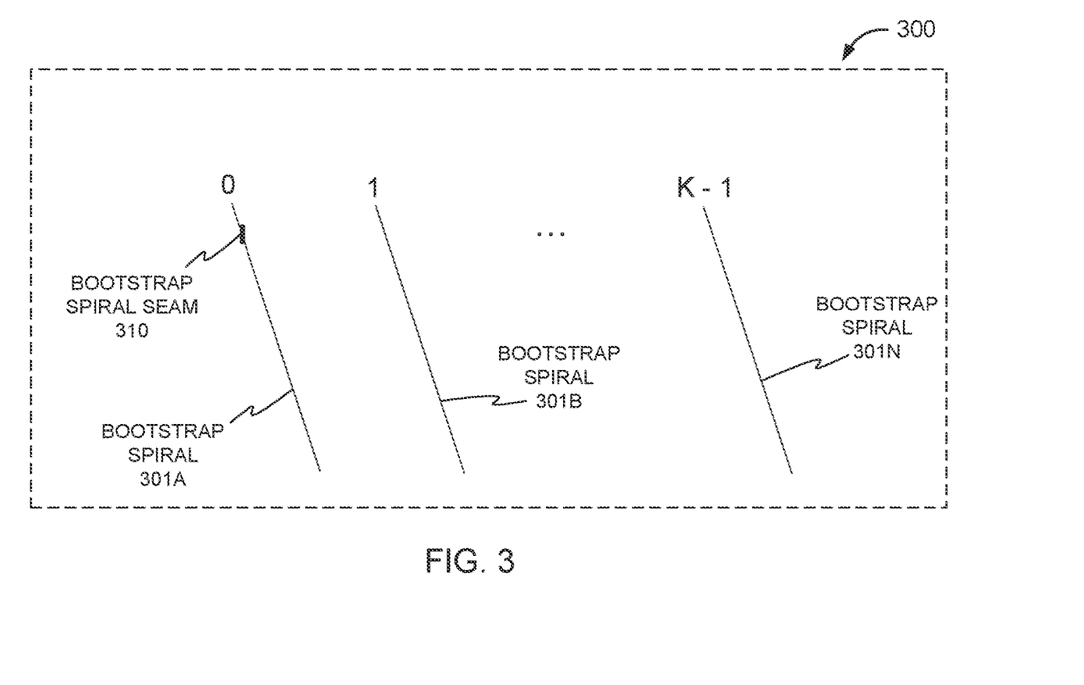
FIG. 3 illustrates a conceptual diagram of one disk surface of a disk drive, in an initial self-servo disk surface development mode during the final stages of manufacture of disk drive, while disk drive is servoing on bootstrap spirals, and one bootstrap spiral seam, on and unique to each respective disk surface of a disk drive, to prepare to write final spirals on the disk surfaces, in accordance with aspects of the present disclosure.

FIG. 3 illustrates a conceptual diagram of one disk surface 300 of a disk drive (e.g., disk drive 15 of FIGS. 2A-2C), in an initial self-servo disk surface development mode during the final stages of manufacture of disk drive 15, while disk drive 15 is servoing on bootstrap spirals 301A, 301B, . . . , 301N ("bootstrap spirals 301"), and one bootstrap spiral seam 310, on and unique to each respective disk surface of disk drive 15, to prepare to write final spirals on the disk surfaces, in accordance with aspects of the present disclosure. Bootstrap spirals 301 may also be labeled from 0 through K-1, in engineering convention, where K is the number of bootstrap spirals. In an illustrative example, disk drive 15 may write bootstrap spirals 301 on empty disk drive surfaces or media, and then use the bootstrap spirals 301 to write final spirals (not shown in FIG. 3) onto the disk drive surfaces. The bootstrap spirals 301 on each respective disk surface of disk drive 15 has a respective bootstrap spiral seam 310 on its first spiral (or referred to by engineering convention as its zeroth spiral). Each bootstrap spiral seam 310 is a unique mark at a respective unique location on its respective disk surface. Disk drive 15 may write bootstrap spirals 301 for each actuator independently. Disk drive 15 may synchronize channel clocks for the actuators with the bootstrap spiral seams 310 for consistency.

Figure 4:
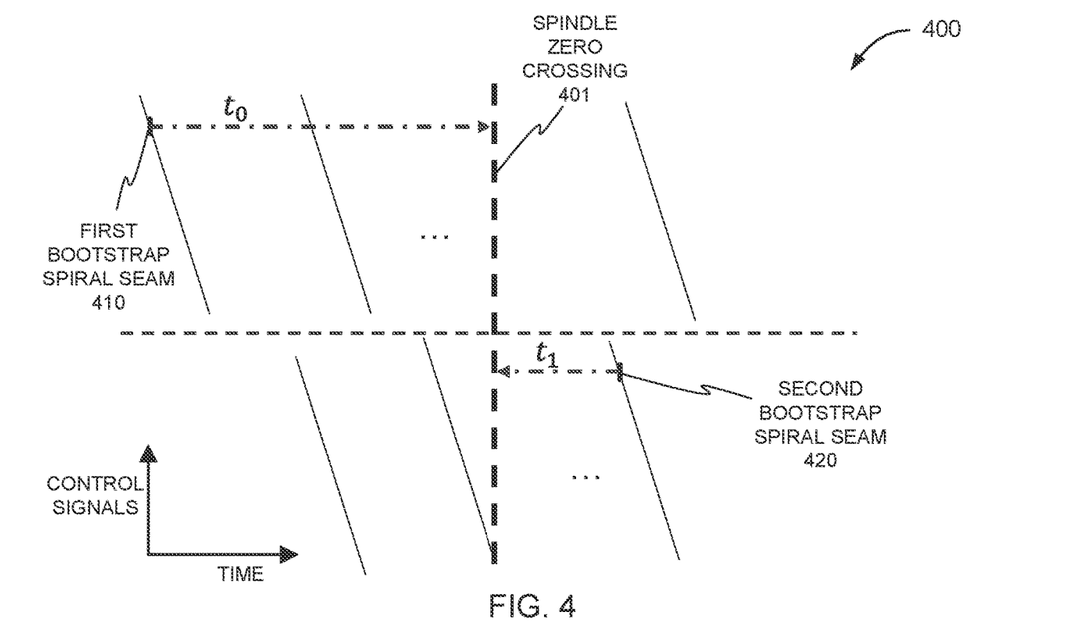
FIG. 4 illustrates a conceptual graph of first and second disk surface features detected over time by heads of first and second actuators of a disk drive using a once-per-revolution spindle zero crossing as a global, unique reference between the first and second actuators, in accordance with aspects of the present disclosure.

FIG. 4 illustrates a conceptual graph 400 of first and second disk surface features detected over time by heads of first and second actuators of a hard disk drive (e.g., disk drive 15 of FIGS. 2A-2C) using a once-per-revolution spindle zero crossing (ZX) 401 as a global, unique reference between the first and second actuators, in accordance with aspects of the present disclosure. Because the disk surfaces that correspond with both the first and second actuators are rotated or spun by the same single spindle, disk drive 15 may use the spindle zero crossing, which disk drive 15 uses in controlling the spin of the disks, as a timing reference across both the first and second actuators. FIG. 4 also depicts a few diagonal lines as a conceptual representation of any number, in different examples, of bootstrap spirals that may communicate bootstrap spiral control signals from different disk surface positions over time, in addition to the unique signals indicating the bootstrap spiral seam locations.

Disk drive 15 may synchronize each of the first and second actuators up to their own respective bootstrap spirals, and synchronize each of their respective channel clocks to each of their respective bootstrap spiral seams. Disk drive 15 may then measure the respective time intervals, or "timing distances," $t_0$ and $t_1$, between the respective first and second actuator bootstrap spiral seams 410, 420, and the spindle zero crossing 401, for the first and second actuators, respectively. That is, one or more read/write heads of the first actuator may communicate signals, to the control circuitry of the disk drive, indicative of detecting the first bootstrap spiral seam 410 and of detecting the spindle zero crossing 401, as the first set of disks spins, with their disk surfaces proximate to the read/write heads of the first actuator, and as the read/write heads are actuated across the disk surfaces by the first actuator; and likewise, one or more read/write heads of the second actuator may communicate signals, to the control circuitry of the disk drive, indicative of detecting the second bootstrap spiral seam 420 and of detecting the spindle zero crossing 401, as the second set of disks spins, with their disk surfaces proximate to the read/write heads of the second actuator, and as the read/write heads are actuated across the disk surfaces by the second actuator. The respective time intervals or timing distances $t_0$ and $t_1$ are thus indicative of the physical circumferential distances between the respective first and second actuator bootstrap spiral seams 410, 420 and the spindle zero crossing 401, respectively, on one or more of the disk surfaces of the first and second sets of disks that correspond with or are engaged with the first and second actuators, respectively.

Figure 5:
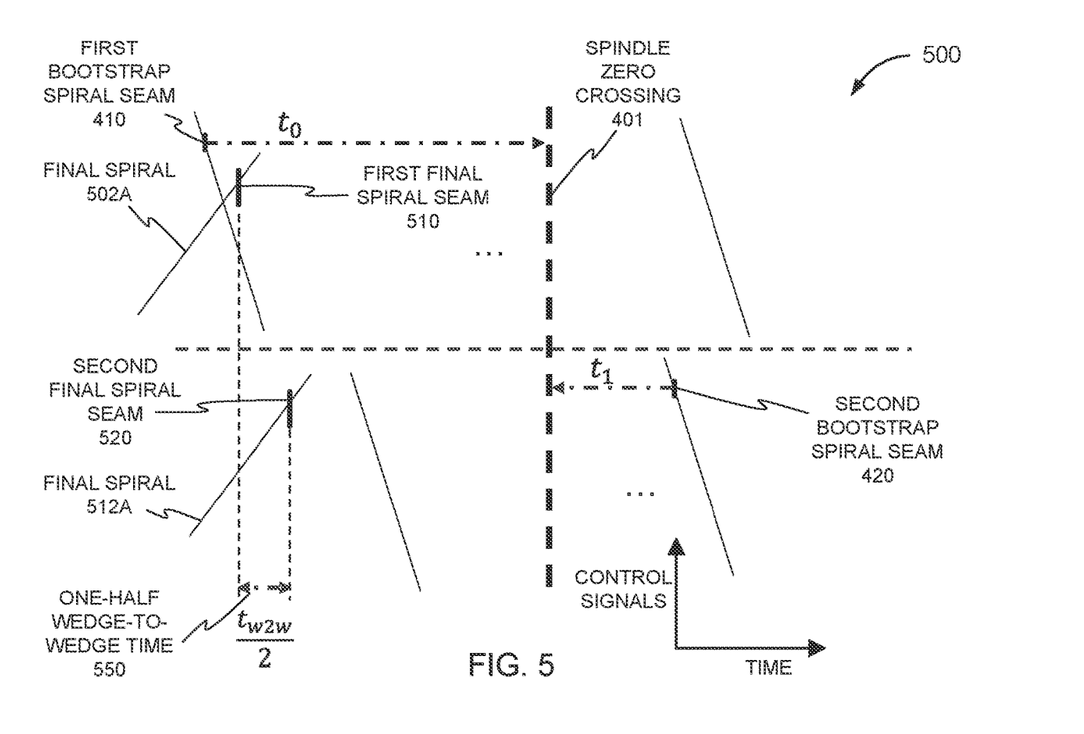
FIG. 5 illustrates a conceptual graph of first and second disk surface features detected over time, with several features in common with FIG. 4, in accordance with aspects of the present disclosure.

FIG. 5 illustrates a conceptual graph 500 of first and second disk surface features detected over time, with several features in common with FIG. 4 as described above, in accordance with aspects of the present disclosure. After disk drive 15 has thus measured and determined the timing distances $t_0$ and $t_1$, disk drive 15 may calculate and determine the difference between the two timing distances $t_0$ and $t_1$ and add the desired one-half wedge-to-wedge time $$\frac{t_{w2w}}{2},$$

to calculate and determine the time interval delta t (Δt) to apply to shift the clock channels for the second actuator, per Equation 1, above. Disk drive 15 may also use the detected position of the first bootstrap spiral seam 410 on the first set of disks to write the final spirals at desired final spiral locations on the first set of disks, including first final spiral seam 510. FIG. 5 also depicts one rightward-slanting diagonal line 502A conceptually representing the one of the final spirals that intersects first final spiral seam 510. Disk drive 15 may perform the determination of delta t and the writing of the final spirals on the first set of disks, along with first final spiral seam 510, in any order or simultaneously, because they are independent operations of each other, in various examples.

After disk drive 15 has determined the delta t time interval and written the final spirals to the first set of disks, disk drive 15 may apply delta t to the second set of disks by shifting the channel clocks of the second set of disks by delta t, in various examples. Disk drive 15 may also synchronize the second set of disks to the channel clocks with the applied delta t shift, in various examples. Disk drive 15 may then write the final spirals on the disk surfaces of the second set of disks, in various examples. This may include disk drive 15 writing the second final spiral seam 520, i.e., the final spiral seam on the second set of disks. FIG. 5 also depicts one rightward-slanting diagonal line 512A conceptually representing the one of the final spirals on the second set of disks that intersects second final spiral seam 520. Because the second set of disks have their final spirals written after their clock channels have been shifted by the determined delta t time interval, second final spiral seam 520 is written at a position on a disk surface in the second set of disks that has a time interval of one-half wedge-to-wedge time 550 from first final spiral seam 510, i.e., that is circumferentially positioned spaced apart from first final spiral seam 510 at the equivalent circumferential distance from the corresponding positions between the two sets of disks to provide for the first and second final spiral seams 510, 520 to be detected at times separated by the time interval of one-half wedge-to-wedge time 550.

Figure 6:
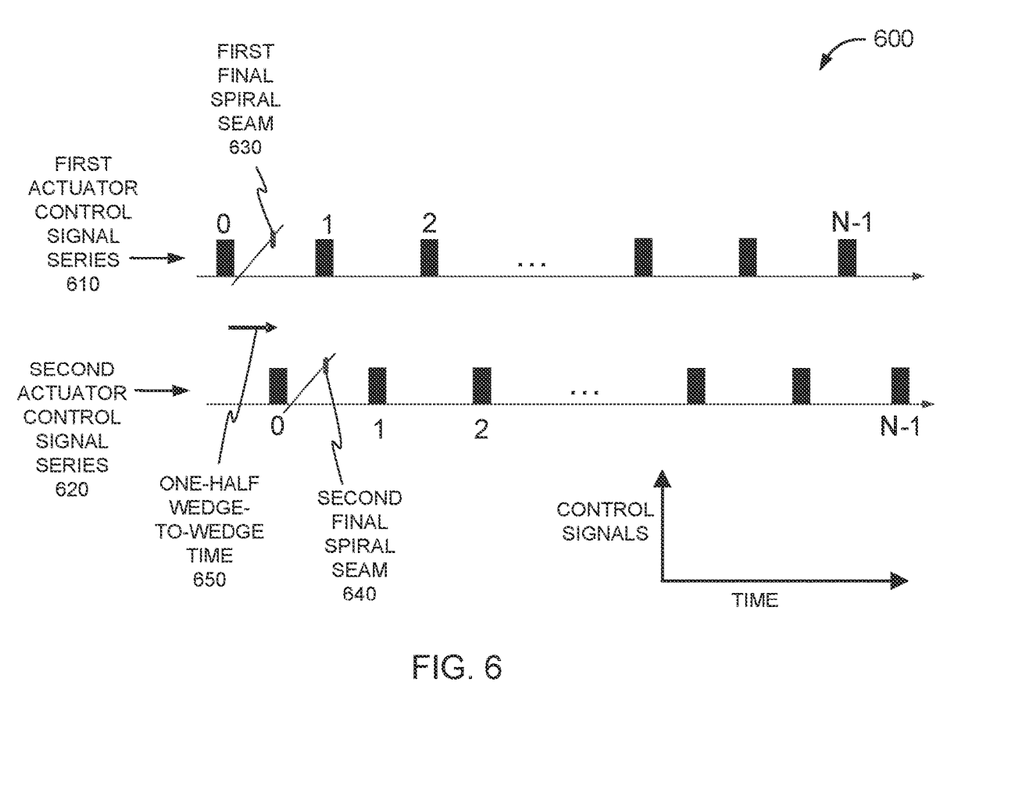
FIG. 6 illustrates a conceptual graph of servo signals received over time, by control circuitry of a disk drive, from disk drive surfaces that correspond with separate first and second actuators, in which the disk drive surfaces that correspond with the first and second actuators have been implemented to have cross-actuator servo wedge alignment, in accordance with aspects of the present disclosure.

After second final spiral seam 520 is written on the second set of disks, which correspond with the second actuator, at one-half wedge-to-wedge time 550, disk drive 15 may go on to write servo wedges on the disk surfaces of both the first and second sets of disks, at locations based on the positions of the first and second final spiral seams 510, 520. Because the servo wedges are written on the first and second sets of disks at locations based on the positions of the first and second final spiral seams 510, 520, the servo wedges are also all spaced at circumferential displacements of desired one-half wedge-to-wedge circumferential distances, between the first and sets of disks, as indicated in FIG. 6, described below. This even spacing out of the servo wedges between the first and second sets of disks thus may enhance or optimize data and control communication load balancing between the first and second actuators of the disk drive.

FIG. 6 illustrates a conceptual graph 600 of servo signals received over time, by control circuitry of a disk drive, from disk drive surfaces that correspond with separate first and second actuators, in which the disk drive surfaces that correspond with the first and second actuators have been implemented to have cross-actuator servo wedge alignment, in accordance with aspects of the present disclosure. This cross-actuator servo wedge alignment may enable more balanced communication, and thereby higher overall throughput and higher effective bandwidth, through the communication channels of the disk drive control circuitry and the read/write heads operating proximate to the disk drive surfaces, for both control read/write signal communications and data read/write signal communications. The general operations of the first and second actuators may otherwise be independent.

In an illustrative example disk drive of this disclosure, e.g., disk drive 15 discussed above, when disk drive 15 creates its servo wedges, the hard disk drive executes a process to follow a requirement of servo wedge alignment between the first and second actuators of the hard disk drive. This process may include a goal of placing the servo wedges that correspond with the second actuator at one-half the wedge-to-wedge time away from the wedges that correspond with the first actuator. In this example hard disk drive, the positioning of the final spiral seam may control the placement of the servo wedges on the disk drive surfaces. The final spiral seam is a unique spot on a disk surface. The servo write process may use the final spirals in the process of writing the product servo wedges. The servo write process may include writing the first and second servo wedges equally spaced about the final spiral seam, such that the final spiral seam is then halfway between the first and second servo wedges. An example hard disk drive of this disclosure may thus align the spiral seam locations between the first and second actuators, in order to align the product servo wedges among the wedges that correspond respectively with the first and second actuators, such that the servo wedges on the second set of disks are halfway between the positions of the servo wedges on the first set of disks.

Thus, FIG. 6 shows a conceptual graph 600 of control signals over time that control circuitry of the disk drive may receive from respective first and second actuators. In particular, FIG. 6 shows a first actuator control signal series 610 and a second actuator control signal series 620. First actuator control signal series 610 shows a series of servo wedge signals, from servo wedges 0 through N−1, received from the first set of disks via the heads of the first actuator, and second actuator control signal series 620 shows a series of servo wedge signals, from servo wedges 0 through N−1, received from the second set of disks via the heads of the second actuator. First actuator control signal series 610 also conceptually depicts first final spiral seam 630, conceptually depicted being intersected by a diagonal final spiral, at a point in time when the first actuator control signal is indicative of detecting the final spiral seam on the disk surfaces of the first set of disks; and second actuator control signal series 620 also conceptually depicts second final spiral seam 640, conceptually depicted being intersected by a diagonal final spiral, at a point in time when the second actuator control signal is indicative of detecting the final spiral seam on the disk surfaces of the second set of disks. As FIG. 6 shows, the servo signals of each of control signal series 610, 620 have been defined with the first and second servo signals (0 and 1) being equally spaced in time (and thus in circumferential position) on either side of the final spiral seam signal, and the servo signals of the second actuator control signal series 620 are thus spaced apart from the servo signals of the first actuator control signal series 610 by the one-half wedge-to-wedge time 650, thereby enhancing or optimizing the effective control and data bandwidth of the disk drive.

Figure 7:
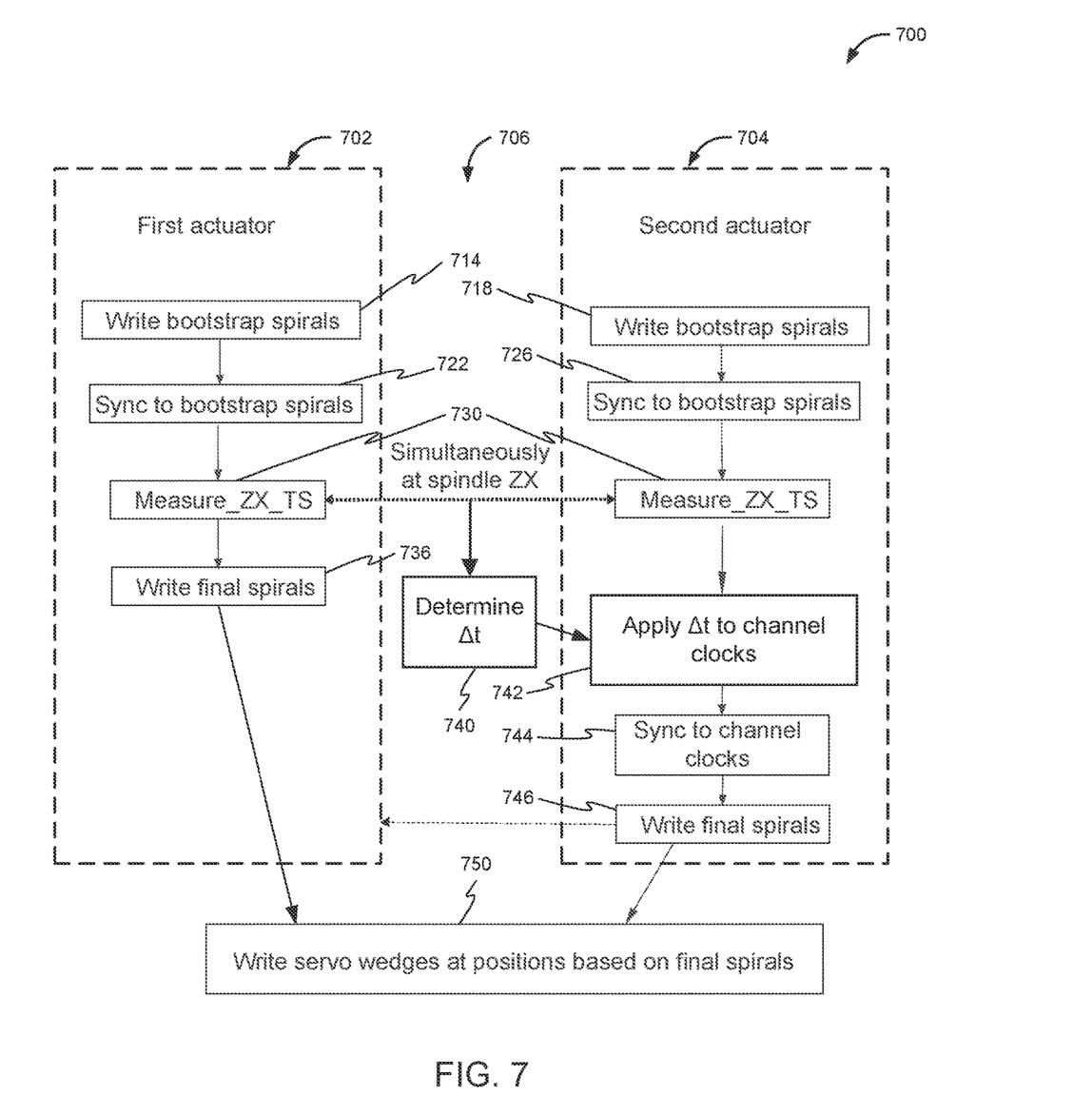
FIG. 7 illustrates a flowchart for an example method that a disk drive may execute for applying a time delta to writing final spirals for a second set of disk surfaces that are configured to correspond with a second actuator, thereby implementing cross-actuator alignment, in accordance with aspects of the present disclosure.

FIG. 7 illustrates a flowchart for an example method 700 that a hard disk drive, such as example disk drive 15 as discussed above, may execute for applying a time delta to writing final spirals for a second set of disk surfaces that are configured to correspond with a second actuator, thereby implementing cross-actuator alignment, in accordance with aspects of the present disclosure. Various aspects of method 700 may be described herein in terms of disk drive 15 outputting instructions or performing functions; this may be understood to indicate or comprise that control circuitry of disk drive 15 outputs instructions to appropriate other components of disk drive 15, or performs functions, for example. Example method 700 shown in FIG. 7 may be compared with example method 23 depicted in FIG. 2C and described above with reference thereto.

Method 700 includes first actuator functions 702 that the disk drive performs specific to a first actuator; second actuator functions 704 that the disk drive performs specific to a second actuator; and functions 706 that the disk drive performs that aren't specific to either the first or second actuators. Disk drive 15 may output instructions addressed to or intended for the first actuator to write bootstrap spirals on the first set of disks with the first actuator (714), and for the second actuator to write bootstrap spirals to the second set of disks (718). Disk drive 15 may then output instructions to the first actuator to synchronize to its bootstrap spirals (722), and to the second actuator to synchronize to its bootstrap spirals (726).

Disk drive 15 may then measure the zero crossing timestamp (ZX_TS) simultaneously at the spindle zero crossing (ZX) (730). As noted above, the spindle zero crossing may serve as a unique, global reference between the first and second sets of disks and the first and second actuators. The spindle speed may also change over time, so disk drive 15 may measure the spindle zero crossing times simultaneously for both actuators. Disk drive 15 may then output instructions for the first actuator to write final spirals on the disk surfaces of the first set of disks (736).

At any point in time after simultaneously measuring the spindle zero crossing time (730) through after the time of the first actuator writing its final spirals (736), disk drive 15 may also determine the delta t time interval (740), using Equation 1 as discussed above. Disk drive 15 may determine delta t (740) before, after, at the same time as, in parallel with, or during any overlapping time as, outputting the instructions for the first actuator to write the final spirals on the first set of disks (736).

After disk drive 15 has determined delta t (740) and written the final spirals with the first actuator (736), disk drive 15 may apply the delta t time interval to the channel clocks of the second actuator (742). Disk drive 15 may also synchronize the second actuator to the channel clocks that are newly shifted by the delta t time interval (744). Disk drive 15 may then output instructions for the second actuator to write the final spirals on the disk surfaces of the second set of disks, positioned based on channel clocks that have been shifted by the determined delta t (746). Disk drive 15 may then output instructions to both actuators to write servo wedges to their respective sets of disks, at positions based on the final spirals, and thereby at positions having cross-actuator alignment of the servo wedges (750).

Disk drive 15 may also perform a measurement and verification of the cross-actuator alignment of the servo wedges. In other examples, disk drive 15 may also output instructions to write the servo wedges in another order, such as causing the first actuator to write its servo wedges before or during the second actuator writing its final spirals, which may still make no difference in successfully implementing the cross-actuator alignment of the servo wedges between the two actuators. Other data storage systems of this disclosure may also implement cross-actuator alignment by and including various other processes than those specifically detailed above.

After the disk drive has written the product servo wedges on the first and second sets of disks corresponding to the first and second actuators, respectively, the disk drive may perform a verification of the cross-actuator servo wedge alignment. The disk drive may measure a timestamp of the common spindle ZX timestamp from each of the first and second actuators. The disk drive may perform the verification at the ID servo zone. The disk drive may calculate and determine the concentric ZX timestamp delta between the multi-actuator head pairs from both the first and second actuators. The disk drive may compare this cross-actuator ZX timestamp delta with the ideal delta of one-half of the wedge-to-wedge time, which may be 1,530 cycles, in one illustrative example.

In testing of example implementations of the present disclosure, disk drives implementing aspects of this disclosure have been observed to have achieved a measured alignment error that is very small relative to the wedge-to-wedge time, such that the disk drives have achieved cross-actuator alignment with high precision, and with a precision high enough to capture essentially the ideal additional bandwidth possible with cross-actuator alignment, or with little or negligible difference in bandwidth optimization from the theoretical ideal, in accordance with various examples. Disk drives of this disclosure may thus be enabled to significantly alternate between data and/or control read/write communications between the first and second actuators due to the cross-actuator alignment, and thus achieve higher data and/or control read/write bandwidth and speed than otherwise analogous disk drives of the prior art.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example they are fabricated into a single integrated circuit or system on a chip (SoC). In addition, the control circuitry may include a suitable preamp circuit implemented as a separate integrated circuit, integrated into the read channel or data storage controller circuit, or integrated into an SoC.

In one example, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory device, component, or system external to the microprocessor, or integrated with the microprocessor in an SoC. In another example, the instructions are stored on the disk and read into a volatile semiconductor memory when the disk drive is powered on. In yet another example, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, the control circuitry, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Methods 23 and 700 and other methods of this disclosure may include other steps or variations in various other embodiments. Some or all of any of methods 23 and 700 may be performed by or embodied in hardware, and/or performed or executed by a controller, a CPU, an FPGA, a SoC, a measurement and control multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Cross-actuator alignment multi-actuator drive data storage systems, devices, and methods are thus shown and described herein, in various foundational aspects and in various selected illustrative applications, architectures, techniques, and methods for cross-actuator alignment in a multi-actuator drive. Persons skilled in the relevant fields of art will be well-equipped by this disclosure with an understanding and an informed reduction to practice of a wide panoply of further applications, architectures, techniques, and methods for cross-actuator alignment in a multi-actuator drive encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device comprising:
a first actuator;
a second actuator;
a first set of disks, comprising one or more disks configured to correspond with the first actuator;
a second set of disks, comprising one or more disks configured to correspond with the second actuator;
one or more processing devices, configured to:
write final spirals on the first set of disks;
determine a time delta to implement cross-actuator alignment between the first set of disks and the second set of disks; and
apply the time delta in writing final spirals for the second set of disks; and
a set of servo wedges written on disk surfaces of the second set of disks, that are circumferentially spaced apart from corresponding circumferential positions of a set of servo wedges written on disk surfaces of the first set of disks by approximately one-half of a circumferential wedge-to-wedge distance, due to the one or more processing devices having implemented the cross-actuator alignment.

2. The data storage device of claim 1, wherein determining the time delta to implement cross-actuator alignment between the first set of disks and the second set of disks comprises:
measuring first and second timing distances from a respective bootstrap spiral seam to a spindle zero crossing, respectively, for each of the first and second actuators.

3. The data storage device of claim 2, wherein determining the time delta to implement cross-actuator alignment between the first set of disks and the second set of disks further comprises:
measuring a difference between the first and second timing distances.

4. The data storage device of claim 3, wherein determining the time delta to implement cross-actuator alignment between the first set of disks and the second set of disks further comprises:
adding one-half of a wedge-to-wedge time to the difference between the first and second timing distances, in accordance with the equation $$\Delta t = t_0 - t_1 + \frac{t_{w2w}}{2},$$

thereby eliminating the desired time delta to be applied to achieve cross-actuator alignment.

5. The data storage device of claim 1, wherein applying the time delta in writing the final spirals for the second set of disks comprises:
shifting one or more channel clocks for the second actuator by the time delta.

6. The data storage device of claim 5, wherein applying the time delta in writing the final spirals for the second set of disks further comprises:
servoing bootstrap spirals of the second set of disks to write the final spirals for the second set of disks, and wherein the one or more processing devices are further configured to:
position the final spirals for the second set of disks based on a position of a final spiral seam for the second set of disks.

7. The data storage device of claim 1, wherein determining the time delta to implement cross-actuator alignment between the first set of disks and the second set of disks comprises:
determining a time delta to position a set of servo wedges on the second set of disks at a selected fraction of a wedge-to-wedge time away from a set of servo wedges on the first set of disks.

8. The data storage device of claim 1, wherein determining the time delta to implement cross-actuator alignment between the first set of disks and the second set of disks comprises:
determining a time delta to position a set of servo wedges on the second set of disks at approximately one-half wedge-to-wedge time away from a set of servo wedges on the first set of disks.

9. The data storage device of claim 1, wherein the one or more processing devices are further configured to:
write bootstrap spirals on the first and second sets of disks, prior to writing the final spirals on the first set of disks.

10. The data storage device of claim 1, wherein the one or more processing devices are further configured to:
synchronize the first and second actuators to bootstrap spirals on the first and second sets of disks, respectively, prior to writing the final spirals on the first set of disks.

11. The data storage device of claim 1, wherein the one or more processing devices are further configured to:
simultaneously measure a spindle zero crossing of the first and second actuators, prior to writing the final spirals on the first set of disks,
wherein determining the time delta to implement the cross-actuator alignment between the first set of disks and the second set of disks comprises measuring timing intervals between the first and second actuators detecting bootstrap spiral seams and detecting the spindle zero crossing.

12. The data storage device of claim 1, wherein the one or more processing devices are further configured to:
write servo wedges on the first set of disks, at circumferential positions based on a position of a final spiral seam on the first set of disks; and
write servo wedges on the second set of disks, at circumferential positions based on a position of a final spiral seam on the second set of disks.

13. The data storage device of claim 1, wherein the one or more processing devices comprise control circuitry.

14. A method comprising:
outputting, by one or more processing devices, instructions to write final spirals on a first set of disks;
determining, by the one or more processing devices, a time delta to implement cross-actuator alignment between the first set of disks and a second set of disks;
applying, by the one or more processing devices, the time delta in outputting instructions to write final spirals for the second set of disks;

measuring first and second timing distances from a respective bootstrap spiral seam to a zero crossing for each of first and second actuators; and measuring a difference between the first and second timing distances.

15. The method of claim 14, further comprising:

adding one-half of a wedge-to-wedge time to the difference between the two timing distances, in accordance with the equation $$\Delta t = t_0 - t_1 + \frac{t_{w2w}}{2},$$

thereby determining the desired time delta to be applied to achieve cross-actuator alignment.

16. The method of claim 14, wherein determining the time delta to implement cross-actuator alignment between the first set of disks and the second set of disks comprises:

determining a time delta that positions a set of servo wedges on the second set of disks at approximately a one-half wedge-to-wedge time distance away from a set of servo wedges on the first set of disks.

17. One or more processing devices, comprising:

means for writing final spirals on a first set of disks in a data storage system;

means for determining a time delta to implement cross-actuator alignment between the first set of disks and a second set of disks;

means for applying the time delta in writing final spirals for the second set of disks;

means for measuring timing distances from a respective bootstrap spiral seam to a zero crossing for each of two actuators;

means for measuring a difference between the two timing distances; and means for adding one-half of a wedge-to-wedge time to the difference between the two timing distances, in accordance with the equation $$\Delta t = t_0 - t_1 + \frac{t_{w2w}}{2},$$

thereby determining the time delta to be applied to implement cross-actuator alignment.

* * * * *